Aug. 30, 1966    H. COHN    3,270,254
ELECTRICAL CAPACITORS AND METHOD OF MAKING THE SAME
Filed April 16, 1962
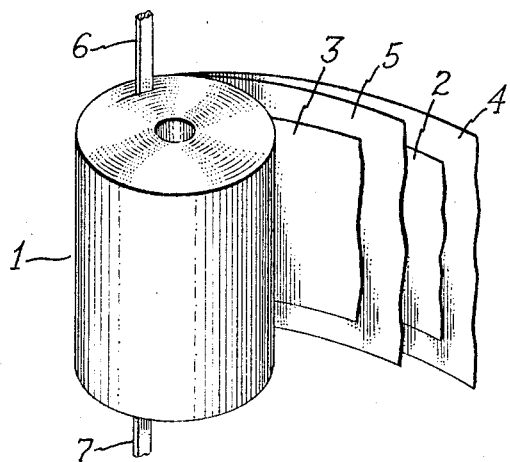
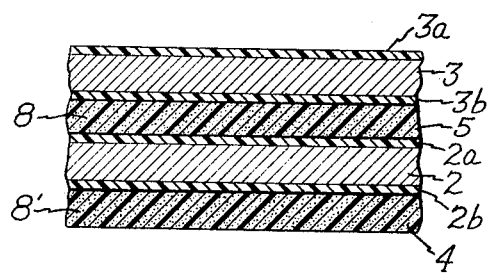
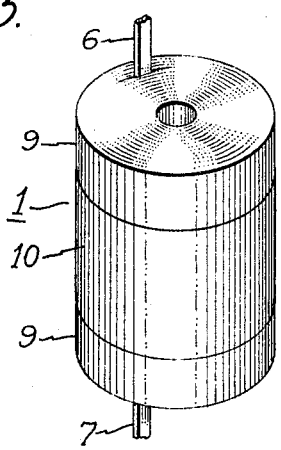
Inventor,
Hans Cohn,
by Sidney Greenberg
His Attorney.

United States Patent Office 3,270,254
Patented August 30, 1966

3,270,254
ELECTRICAL CAPACITORS AND METHOD
OF MAKING THE SAME
Hans Cohn, Columbia, S.C., assignor to General Electric Company, a corporation of New York
Filed Apr. 16, 1962, Ser. No. 187,574
5 Claims. (Cl. 317—230)

The present invention relates to electrical capacitors, and more particularly to electrical capacitors of the solid electrolyte type and to a method of making the same.

Solid electrolyte capacitors are known which comprise a porous body or so-called "slug" formed of compressed adherent particles of a film-forming metal such as tantalum, an anodic dielectric oxide film on the surfaces of the particles, a layer of semi-conductive oxide such as manganese oxide on the dielectric film, and an electrically conductive layer such as graphite on the semi-conductive layer. Such construction of solid electrolyte capacitors has certain drawbacks, such as the difficulty in applying the graphite or other conductive metallized outer layer without producing short circuits in the capacitor unit, the difficulty in adapting such structure for non-polar units, and other disadvantages.

It is an object of the invention to provide an improved electrical capacitor of solid electrolyte type which avoids the above and other disadvantages of prior types of such capacitors.

It is another object of the invention to provide a solid electrolyte capacitor of wound type comprising foil electrodes.

Another object of the invention is to provide a solid electrolyte capacitor which is adapted for use in polar and non-polar capacitor units without substantial change in configuration and which is suitable for D.C. or continuous A.C. operation.

It is a further object of the invention to provide a novel method of making capacitors of the above-described construction.

Other objects and advantages will become apparent from the following description and the appended claims.

With the above objects in view, the present invention relates to an electrical capacitor comprising a pair of electrodes, at least one of which is composed of a film-forming metal having a dielectric oxide film formed thereon, the electrodes being separated by spacer material impregnated with a semi-conductive oxide material and arranged in contact with the dielectric oxide film.

In a particularly preferred embodiment of the invention, the foil electrodes are convolutely wound into a rolled unit with the spacer material separating the electrodes, and in accordance with the process provided by the invention, the rolled unit is provided with the semi-conductive oxide material by impregnating the spacer material with the semi-conductive oxide material after the roll is formed.

The invention will be better understood from the following description taken in conjunction with the accompanying drawing, in which:

FIG. 1 shows a partially unrolled wound capacitor unit in which the present invention may be embodied;

FIG. 2 is a fragmentary detailed view in cross-section of the components of the capacitor unit of FIG. 1;

FIG. 3 is a view of a fully wound capacitor roll embodying the present invention.

Referring now to the drawing and in particular to FIG. 1, there is shown a partially unrolled convolutely wound capacitor assembly 1 comprising a pair of superimposed electrode foils 2 and 3 composed of tantalum or other suitable film-forming electrode material, the foils being separated by spacer sheets 4 and 5 composed of a thermally resistant porous absorbent material such as glass cloth, the spacer sheets, as shown, being somewhat wider than electrode foils 2 and 3 to avoid the risk of short circuiting between the foils. Instead of tantalum, the electrode foils may be of other suitable metals such as aluminum, niobium, titanium, and other oxide film-forming metals as well as alloys thereof. The surfaces of foils 2 and 3 are preferably, but not necessarily, etched in accordance with known processes to provide an extended surface area for increasing the available capacitance of the unit. One or both foils 2, 3 are provided with an anodically formed dielectric oxide layer. In accordance with the invention, absorbent spacer sheets 4 and 5 have incorporated therein a semi-conductive oxide material, as more fully described hereinafter. Terminal leads 6 and 7 extending from opposite ends of roll 1 are respectively electrically connected to foils 2 and 3 by welding or in any other suitable manner. The leads may, if desired, extend from the same end of the capacitor roll.

In a polar type capacitor, only one of the foils 2, 3 (the anode) will have the above-mentioned dielectric oxide film formed thereon, whereas in a non-polar capacitor, each foil will have such a film formed thereon.

FIGURE 2 shows a fragmentary sectional view of an embodiment of the capacitor assembly produced in accordance with the invention. As shown, the assembly comprises foil 2 with anodic dielectric oxide films 2a, 2b formed on opposite surfaces, foil 3 with similar dielectric oxide films 3a, 3b, and separator sheets 4, 5 alternately arranged with respect to the film-formed foil electrodes so that in the rolled unit the spacer sheets 4, 5 separate the foil electrodes from each other. In accordance with the process of the invention as hereinafter disclosed, spacer sheets 4 and 5 are impregnated with a semi-conductive oxide material 8, 8' such as $MnO_2$ which serves as a solid electrolyte for the necessary electrical conduction between filmed electrodes 2 and 3.

In the completed form of the capacitor as shown in FIGURE 3, the wound capacitor unit is provided with an outer covering 9 comprising one or more turns of a nonabsorbent thermally resistant sheet material composed of glass cloth, for example. A band 10 of thermally resistant adhesive tape of a width substantially less than covering 9 is wound about outer covering 9 and serves to hold the capacitor unit in wound assembly. The unit may be enclosed and hermetically sealed in a suitable container (not shown) or encapsulated in suitable plastic materials (e.g., epoxy resin) in accordance with known procedures, if desired.

The process of making the above-described unit comprises initially anodizing the foil electrodes, convolutely winding together the superposed foils and spacer sheets with leads attached to the foils, covering the wound assembly with the nonabsorbent thermally resistant sheet 9, and affixing the adhesive band 10 around the roll to hold it together. The roll is then immersed, preferably under vacuum, in an aqueous manganous nitrate solution for impregnating the spacer sheets 4 and 5 with the latter solution, and sufficient heat is then applied to convert the manganous nitrate in situ to manganese dioxide. The unit is then subjected to an electrolytic treatment for re-forming the anodic oxide films on the foils, and the unit is then re-impregnated with the manganous nitrate solution as previously described. The above-described steps of re-forming the anodic films and the application and pyrolytic conversion of the manganous nitrate is accomplished in accordance with known procedures, and is disclosed, for example, in British Patent 747,051 and U.S. Patent 2,981,647. The re-forming of the anodic films may be carried out by immersing the unit in a dilute aqueous electrolyte containing an acid such as nitric acid, formic acid, acetic acid, propionic acid, or other suitable acids, or containing salts such as ammonium salts of the above-mentioned acids, ammonium carbonate or bicarbonate, or other acids or salts which are either volatile or decomposed into volatile components at the thermal conversion temperature of manganous nitrate.

The nature of spacer material 4, 5 is important for the purposes of the invention, and it should be such that it readily absorbs the solution of manganous nitrate or other equivalent semiconductive material which may be employed. It should also be sufficiently heat-resistant to withstand the pyrolytic conversion temperatures, which are normally in the vicinity of 290° C. or higher. For this reason, the spacer material is preferably made of inorganic material such as glass, ceramics, asbestos, mica, or the like. Preferably, the spacer material is made with a suitable absorbent binder material such as hydroxy-ethyl cellulose incorporated therein to impart sufficient strength and flexibility to the sheet material to facilitate the winding thereof. Mineral fiber sheets with such binder material therein which are satisfactory for use in the present invention are readily available in the commercial market and the manufacture thereof is fully disclosed in U.S. Patent 2,906,660, which is incorporated by reference herein. In a typical embodiment thus prepared, the spacer material may comprise very thin glass fibers and a small percentage of a binder material which is absorbent and decomposes at about 200° C., and there is obtained a structure similar to paper which is of compact calendered nature and which is absorbent of aqueous as well as non-aqueous solutions.

For reasons indicated previously, covering layer 9 should also be of heat resistant material and may, therefore, in general be of the same base materials (e.g., mineral fibers) mentioned above as suitable for spacer material 4, 5. However, covering 9 should be non-absorbent, in contrast to the absorbent qualities of spacer material 4, 5, in order to avoid accumulation of $MnO_2$ thereon. Such accumulation would have the disadvantages that the diameter and weight of the capacitor roll are thereby unnecessarily increased, resulting in a bulky unit, and such outside accumulation of $MnO_2$ is neither needed nor useful in the operation of the capacitor.

The non-absorbent characteristic may be imparted to covering 9 by impregnating the base screen-like mineral fiber material, such as made of woven fibers of glass, ceramics, asbestos, mica or the like, with non-wettable and non-absorbent materials such as Teflon, Kel-F, silicones, and the like. The thus treated covering is thereby made non-absorbent, although permeable, to aqueous manganous nitrate solution (as well as other aqueous and non-aqueous solvents). Alternatively, covering 9 may be made simply of screen-like material composed of Teflon, Kel-F, silicone resins or the like formed of woven fibers or foraminous sheets.

Adhesive band 10 is composed of thermally resistant materials such as described above for covering 9 and is also preferably made non-absorbent as in the case of the latter. Band 10 is provided on its inside surface with a coating of a pressure sensitive adhesive material, such as a thermosetting silicone resin, so as to hold the wound roll together by a simple wrapping step. The use of band 10 may, however, be dispensed with, and in such case, covering 9 may be provided with the described pressure sensitive adhesive coating to serve the function of band 10, the adhesive coating being of narrow width to allow permeability through covering 9 of the manganous nitrate solution.

A typical process which may be carried out for producing the capacitors of the invention is as follows, it being understood that the particular values set forth are merely illustrative and are not to be construed as limiting the invention in any way:

The process described is applicable to making 100 volt .2 microfarad non-polar capacitors.

Tantalum foils 3″ x ⅜″ and 0.5 mil thick with tantalum wire leads welded thereon are provided with oxide dielectric films by anodizing in a film forming solution of aqueous phosphoric acid. The film-formed foils separated by one or more layers of absorbent glass cloth ½″ x 4″ and 1 to 1.5 mil thick are then convolutely wound into a roll, and then 1 to 1½ turns of a non-absorbent glass cloth ⅜″ wide and 1.5 mil thick is applied as an outside covering on the roll. The roll is held in wound assembly by applying thereon a strip of glass tape ¼″ wide and 7 mil thick having pressure sensitive adhesive thereon.

The wound roll is then subjected to a film re-forming step by anodizing treatment in a nitric acid solution. After removal of the nitric acid by elevated heat treatment, the roll is immersed in an aqueous solution of manganous nitrate, removed, and heated at about 290° C. for a few minutes for pyrolytically converting the manganous nitrate to manganese dioxide. The dipping and heating steps are twice repeated, and then the roll is anodically re-formed in an acetic acid electrolyte bath. After the re-forming step and removal of the acetic acid by elevated heat treatment, the roll is again dipped into the manganous nitrate solution, and heated for pyrolytically converting the manganous nitrate as before. After the dipping and heating steps are again repeated, the unit is re-formed in acetic acid as previously.

Tests on samples made as above-described showed that the units had a capacitance of 0.2 mfd., power factor of 3 to 4% at 120 cycles per second, and leakage current of less than 1 micro-amp at 120 volts and room temperature after 150 hours.

It will be seen, therefore, that the present invention provides a novel solid electrolyte capacitor of wound form and wherein the treatment which produces the solid electrolyte features is carried out after the roll is formed. There is thus avoided any difficulty which might arise from winding the components of the unit after the semiconductive material is applied and pyrolytically converted, due to the brittle nature of the thus-treated components.

The construction provided by the invention has a marked advantage over prior types of solid electrolyte capacitors which are characterized by sintered slug anodes and graphite counterelectrode material, particularly in that the difficulty in applying graphite or like conductive material on the unit without causing a short circuit between the anode and the graphite layer is entirely avoided by the use of a foil cathode.

Moreover, the foil cathode used in accordance with the invention may be film-formed or not and thus readily lends itself to making polar or non-polar units as desired without necessitating a change in the configuration of the unit. It has further been unexpectedly found that non-polar tantalum capacitors of the described construction are suitable for continuous A.C. application even for voltages comparable for D.C. application. This feature has not heretofore been characteristic of even liquid types of tantalum electrolytic capacitors.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What I claim as new and desire to secure by Letters Patent of the United States is:

1. A solid electrolyte capacitor comprising a convolutely wound assembly of a superimposed pair of foil electrodes at least one of which is composed of a film-forming metal having a dielectric oxide film formed thereon, said foil electrodes being separated by spacer material comprising a thermally resistant, porous absorbent sheet material impregnated with an in situ heat-produced semiconductive oxide material and arranged in contact with said dielectric oxide film, and a covering on said wound assembly comprising thermally resistant non-absorbent porous sheet material.

2. A solid electrolyte capacitor comprising a convolutely wound assembly of a superimposed pair of foil electrodes at least one of which is composed of a film-forming metal having a dielectric oxide film formed thereon, said foil electrodes being separated by spacer material comprising a thermally resistant, porous absorbent sheet material impregnated with an in situ heat-produced semi-conductive oxide material and arranged in contact with said dielectric oxide film, a covering on said wound assembly comprising a thermally resistant non-absorbent sheet material, and a strip of adhesive thermally resistant non-absorbent sheet material overlying and surrounding said covering for retaining said wound assembly and covering thereon in assembled condition.

3. A solid electrolyte capacitor comprising, in combination, a convolutely wound assembly of a superposed pair of tantalum foil electrodes each having an anodic dielectric oxide film formed thereon, said foil electrodes being separated by spacer sheet material comprising thermally resistant absorbent sheet material impregnated with in situ heat-converted manganese dioxide and arranged in contact with said anodic dielectric oxide films of the respective foil electrodes, a covering on said wound assembly comprising thermally resistant non-absorbent porous sheet material, and a strip of adhesive thermally resistant non-absorbent sheet material overlying and surrounding said covering for retaining said wound assembly and covering thereon in assembled condition.

4. The method of making a solid electrolyte capacitor which comprises convolutely winding a superposed pair of foil electrodes with thermally resistant absorbent spacer material therebetween, at least one of said foil electrodes having formed thereon a dielectric oxide film in contact with said spacer material, covering the wound assembly with thermally resistant non-absorbent porous material, impregnating said spacer material with a material convertible to semi-conductive oxide material, and pyrolytically converting said impregnating material in situ to a semiconductive oxide material.

5. The method of making a solid electrolyte capacitor which comprises superposing a pair of anodically film-formed foil electrodes with thermally resistant absorbent spacer material therebetween and convolutely winding the superposed assembly into a roll, covering the wound assembly with thermally resistant non-absorbent material, impregnating the thus-wound spacer material with an aqueous solution of manganous nitrate, pyrolytically converting the manganous nitrate into manganese dioxide, reandozing the foil electrodes, and repeating the steps of anodizing, impregnating, and pyrolytically converting as previously defined.

References Cited by the Examiner
UNITED STATES PATENTS

| | | | |
|---|---|---|---|
| 2,005,279 | 6/1935 | Van Geel | 317—230 |
| 2,310,932 | 2/1943 | Brennan | 317—230 |
| 2,973,465 | 2/1961 | Cronquist et al. | 317—230 |
| 2,989,447 | 6/1961 | Power | 317—230 |
| 3,058,040 | 10/1962 | Wellington | 317—230 |
| 3,066,247 | 11/1962 | Robinson | 317—230 |
| 3,093,883 | 1/1963 | Haring et al. | 317—230 |

JOHN W. HUCKERT, *Primary Examiner.*

DAVID J. GALVIN, *Examiner.*

J. A. ATKINS, J. D. KALLAM, *Assistant Examiners.*